Feb. 18, 1930.　　C. A. CARLSTROM　　1,747,502
BUTTER CUTTER
Filed Sept. 15, 1928　　3 Sheets-Sheet 1
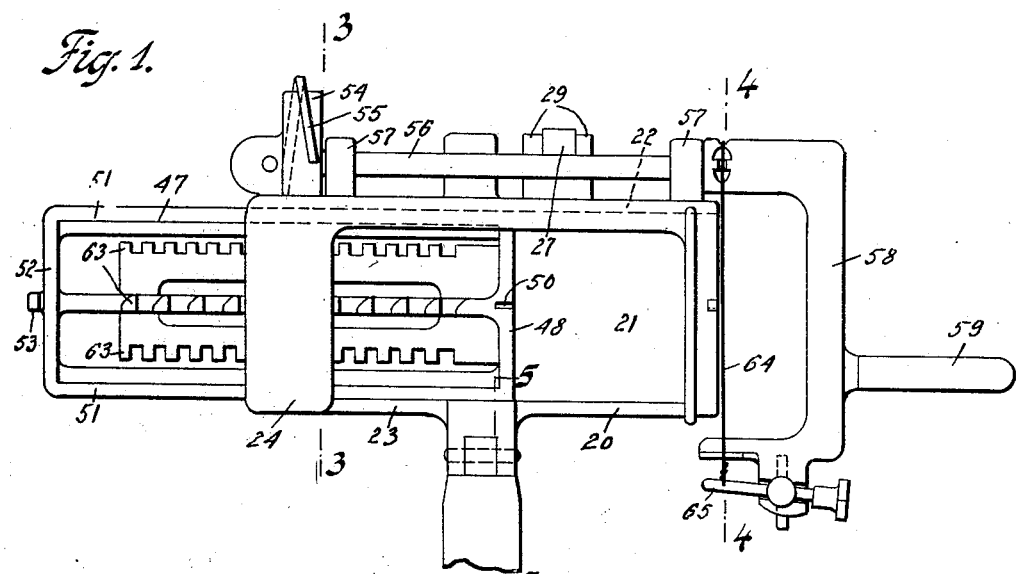
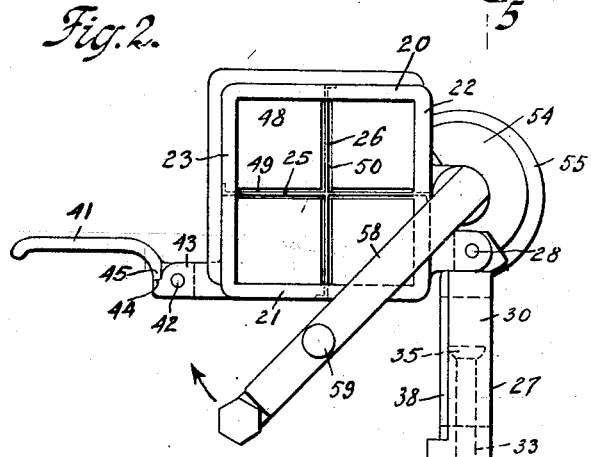
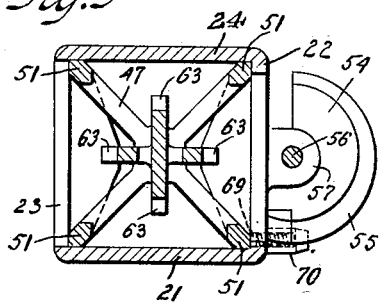
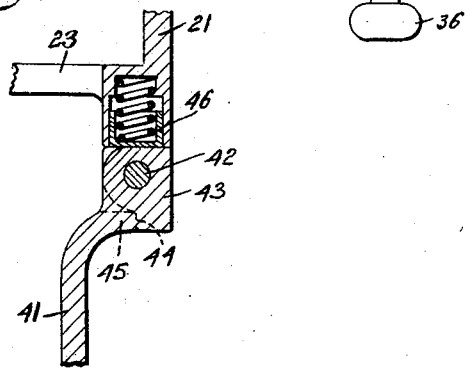
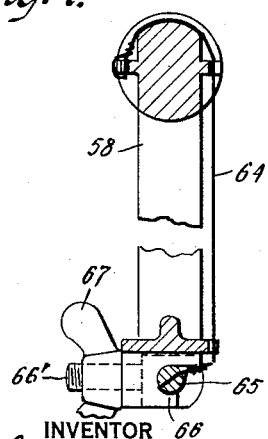
INVENTOR
C. A. Carlstrom
BY
Sigmund Herzog
ATTORNEY Feb. 18, 1930. C. A. CARLSTROM 1,747,502
BUTTER CUTTER
Filed Sept. 15, 1928   3 Sheets-Sheet 2
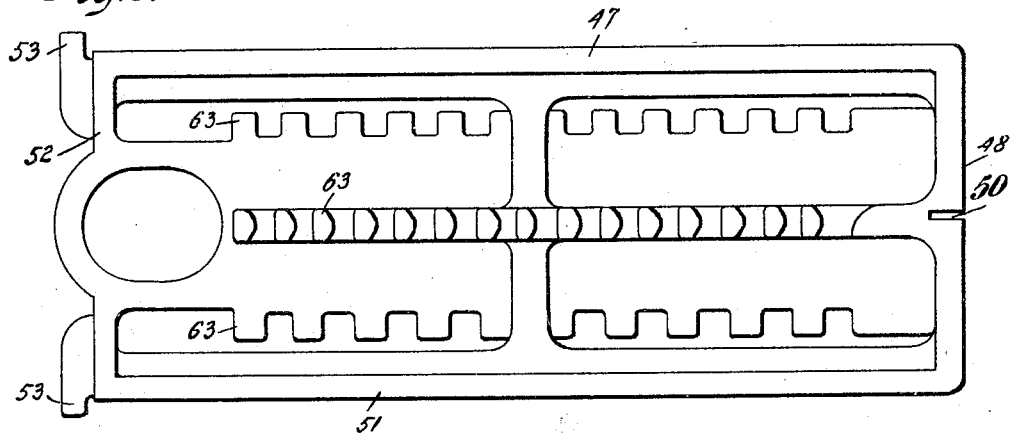
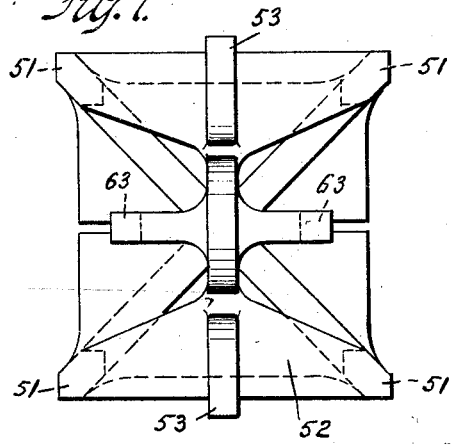
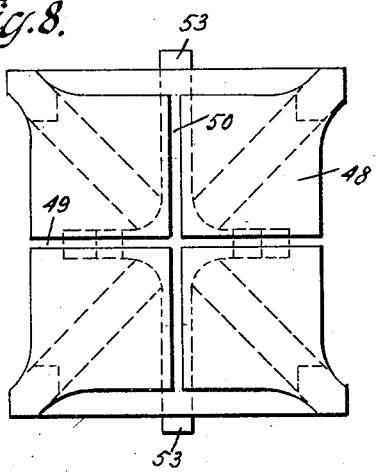
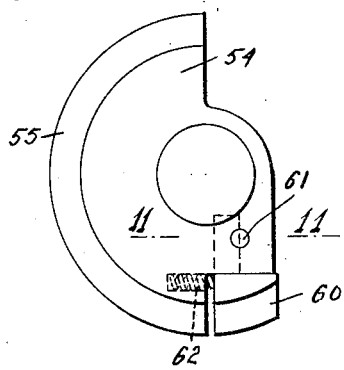
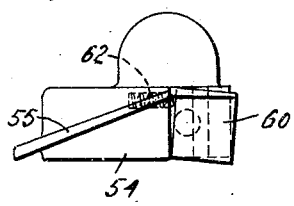
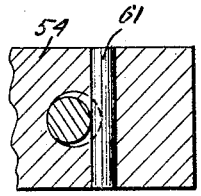
INVENTOR
C. A. Carlstrom
BY
ATTORNEY Feb. 18, 1930.                     C. A. CARLSTROM                          1,747,502
                                    BUTTER CUTTER
                           Filed Sept. 15, 1928         3 Sheets-Sheet 3

INVENTOR
C. A. Carlstrom
BY
Sigmund Herzog
ATTORNEY

Patented Feb. 18, 1930

1,747,502

UNITED STATES PATENT OFFICE

CARL A. CARLSTROM, OF NEW YORK, N. Y.

BUTTER CUTTER

Application filed September 15, 1928. Serial No. 306,183.

The present invention relates to improvements in butter cutters, and more particularly to that type wherein a mass of butter is automatically molded and cut into squares ready for serving.

One of the objects of the invention is to provide a device of the character mentioned which is adapted to take a block of molded or print butter, form or mold the same into a plurality of columns and then cut, without waste, small individual pieces, all of the same size.

Another object of the invention is to so construct the machine that the thickness of the individual butter pieces may be varied according to the requirements.

A further object of the invention is to provide a machine of the type mentioned which comprises comparatively few parts, and in which each element is as smooth as possible so that it can be readily cleaned.

A still further object of the invention is to provide a machine of the character mentioned which is simple in construction, efficient in operation, durable in use and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 12:
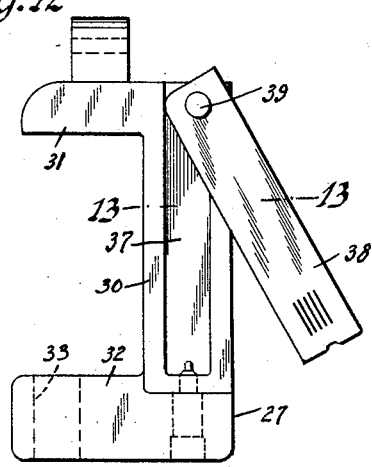
Figure 13:
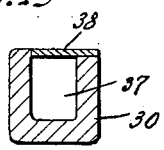
Figure 14:
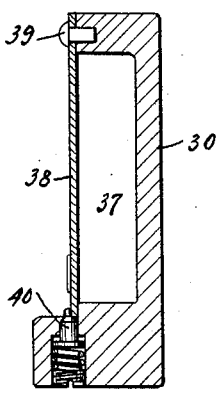
Figure 15:

Figure 1 is a top plan view of a butter cutter constructed in accordance with the present invention; Fig. 2 is a front elevation thereof; Fig. 3 is a section taken on line 3—3 of Fig. 1; Fig. 4 is a section taken on line 4—4 of Fig. 1, on a larger scale; Fig. 5 is a section taken on line 5—5 of Fig. 1, also on a larger scale; Fig. 6 is a top plan view of the expresser of the improved machine; Fig. 7 is an end view of the said expresser; Fig. 8 is also an end view thereof, looking from the opposite direction; Fig. 9 is an elevation, on a larger scale, of the expresser advancing mechanism; Fig. 10 is a bottom plan view of the mechanism shown in Fig. 9; Fig. 11 is a section taken on line 11—11 of Fig. 9, on a still larger scale; Fig. 12 is an elevation, on a larger scale, of a clamp for fixing the machine on a table or support; Fig. 13 is a section taken on line 13—13 of Fig. 12; Fig. 14 is a longitudinal section taken through the said clamp; and Fig. 15 is an elevation of a modified cutter employed on the machine.

In the drawings, the numeral 20 indicates in its entirety a magazine, into which a block of molded or print butter is placed, the said magazine comprising a bottom 21 of oblong configuration, from which rise open sides 22 and 23, connected by an open top 24. The magazine is rectangular in transverse cross-section, as clearly appears from Figs. 2 and 3 of the drawings, and of a size to accommodate the transverse cross-section of the butter block. Both ends of the magazine are open, the rear end being unobstructed while in the front end are mounted a horizontal cutter bar 25 and a vertical cutter bar 26, which sever the block of butter into longitudinal columns as it is pushed forward by the expresser hereinafter to be described.

The magazine may be attached to a table or support by means of a clamp 27, which is pivoted at 28 to lugs 29, the latter being made integral with the magazine side 22. The clamp comprises a shank 30, having a fixed jaw 31 extending at right angles thereto. In parallel relation to the said jaw is disposed a beam 32, provided with a screw-threaded opening 33, through which extends a screw-threaded rod 34 provided with a clamping jaw 35 at one of its ends and with a finger-piece 36 at its other end. The clamping jaw 35 is adapted to co-operate with the fixed jaw 31, as usual in constructions of this type. In the shank 30 is provided a recess 37, which is adapted to be closed by a door 38, the latter being pivoted at 39 to the said shank. The door is adapted to be held in closing position by a spring-pressed lug 40. Into the recess in the shank 30 are adapted to be placed spare parts of the device, such as cutter wires hereinafter to be described.

Instead of mounting the magazine on a support, the same may be held by one hand of the user during the butter cutting operation. For this purpose a handle 41 is pivoted at 42 to a lug 43 on the magazine side 23. The lug 43 is provided with stops 44, against which downwardly bent fingers 45 of the handle are adapted to abut to hold the said handle in horizontal position in relation to the magazine when the latter is to be supported by the user. A spring-pressed pin 46 is mounted within the lug 43 and is adapted to abut against the handle, to keep the same in parallel relation to the magazine side 23, when swung around its pivot 42 into such position.

An expressing die 47 is adapted to be slidably mounted in the magazine, said die including a head 48 which serves to feed the butter block forward toward the stationary cutter bars 25 and 26. This head is provided with a horizontal groove 49 and a vertical groove 50 in alignment with the said cutter bars, thereby permitting the said expressing die to be fed forward to an extent that the entire bulk of the butter block is discharged from the magazine at the end of the feeding stroke of the expressing die. The expressing die is in the form of a skeleton frame, including longitudinal bars 51, to which the head 48 is fixed, the said bars forming guides for the expressing die in its movement within the magazine. On the outer head 52 of the expressing die are mounted stops 53, for co-operation with the open outer end of the magazine, said stops limiting the inward movement of the expressing die.

The expressing die is advanced step by step by a rack and worm mechanism. The worm denoted by the numeral 54, comprises only an incomplete turn 55 of a spiral screw-thread and is adapted to mesh with a rack on the expressing die, each rotation of the worm producing an advance of one tooth of the rack. The worm is attached to a shaft 56, journaled in bearings 57 on the magazine side 22, and having fixedly attached to its end adjacent the inner head of the said magazine a bail-shaped arm 58. On this arm is mounted a handle 59. The leading edge 60 of the thread 55 is made of a separate piece, which is pivotally attached at 61 to the body portion of the worm and is under the action of a spring 62, which has a tendency to extend the said leading edge at an angle to the adjacent fixed portion of the thread, as clearly shown in Fig. 10 of the drawings.

The purpose of this arrangement will be described hereinafter.

The expressing die has mounted thereon a plurality of longitudinally extending racks 63, in the present case four racks. The teeth of each rack are equi-distantly spaced, but the distance between the teeth of each rack differs from those of the other racks. The purpose of this arrangement is to provide for varying feed, it being obvious that the greater the distance between the teeth of a rack the greater will be the thickness of the slices of butter severed from the butter columns. The teeth of the racks 63 are beveled on their underfaces, that is on the surface first coming into contact with the leading edge 60 of the thread 55 (see Figs. 1 and 6 of the drawings).

The cutter which severs the butter slices from the columns is in the form of a fine wire 64, which is stretched across the bail-shaped bar 58, one end of the wire being fixed to the said bar adjacent its mounting on the shaft 56 and its other end being secured to a spindle 65, which is rotatably mounted on the head 66 of a screw bolt 66', the latter being in engagement with a wing nut 67. When this wing nut is partially unscrewed, the spindle 65 may be turned to put the wire cutter under tension, after which the wing nut is screwed home whereby the spindle is fixed in position. Instead of a straight wire, as shown in Fig. 4 of the drawings, a sinusoidal or like wire may be employed, as shown at 68 in Fig. 15 of the drawings, producing a wavy cut for the purpose of giving a decorative effect to the butter slices. The wire cutter 64 is adapted to swing past the discharge end of the magazine and cut off the butter as it is forced by the expressing die past the dividing stationary cutter bars 25 and 26.

In order to prevent the expressing die from being moved in a direction opposite to its feeding stroke while the worm is disengaged from the rack on said expressing die, a spring-pressed plunger 69 is slidably mounted on an extension 70 on the side 22 of the magazine, said plunger being in engagement with one of the bars 51 of the expressing die.

The operation of the device is as follows: The block of butter having been inserted into the magazine through the open outer end thereof, the expressing die is, with its head 48 facing the rear end of the butter block, inserted into the magazine, after the proper rack has been selected for co-operation with the worm 54, the first tooth of the said rack being brought into operative relation to the spiral thread of the worm. When now the shaft 56 is turned in the direction of the arrow shown in Fig. 2 of the drawings, the butter block is intermittently advanced by the expressing die and during each period of rest the wire cutter severs from the butter columns, which are forced through the magazine past the stationary cutters 25 and 26, slices of butter, ready to be served. It is obvious that the worm gear and the arm 58 must be so mounted on the shaft 56 that the butter severing operation takes place during periods of rest of the expressing die.

After the butter has been entirely exhausted from the magazine, the shaft 56 is turned so as to disengage the worm from the rack, whereupon the expressing die may be removed from the magazine, and the latter is thus again in condition to receive a new charge.

It is to be noted that, inasmuch as the worm is not adjustable, it would feed the expressing die always the same distance forward irrespective of the spacing of the teeth of the several racks thereof. It is for this reason that the leading edge of the worm is made of a separate piece and the latter is yieldingly mounted on the worm. When the rack with the largest teeth spacings is caused to co-operate with the worm, this yielding leading edge of the worm has really no function whatever. When, however, the other racks are caused to co-operate with the said worm, the said yielding leading edge, in being brought into engagement with a tooth, causes a slight return movement of the expressing die and brings the tooth into alignment with the fixed portion of the worm, which then advances the expressing die for the purpose mentioned. However, inasmuch as the expressing die first moves backwards, it obviously is disengaged from the rear edge of the butter block and in the forward movement of the expressing die advances the butter block a distance that is less than the distance through which it is advanced by a rack having larger tooth spacings.

It will be appreciated from the foregoing that the improved machine is highly desirable for use in hotels and restaurants, where it is necessary to divide the butter into small portions to be placed upon individual dishes. It will also be appreciated that the improved machine is very simple and may, therefore, be cheaply manufactured and placed upon the market to be sold for a comparatively small price. It will also be noted that, inasmuch as the machine comprises comparatively few parts and each element is as smooth as possible, it can be readily cleaned. This is, of course, desirable from a sanitary standpoint.

What I claim is:

1. A butter cutter, comprising a magazine for supporting a block of butter, means on said magazine for subdividing the block of butter into a plurality of columns at one end, an expressing die adapted to feed the butter block forward toward said dividing end, a rack on said expressing die, the teeth of said rack being beveled on their underfaces, a shaft journaled on said magazine, a worm including part only of a single screw-thread adapted to co-operate with said rack for intermittently advancing said expressing die, a cutter carried by said shaft for severing the ends of said columns forced beyond said magazine, said cutter being so mounted in relation to said worm that the cutting operation takes place during the period of disengagement of said worm from said rack, and means for fixing the position of said expressing die on said magazine during the periods of disengagement of said worm from said rack.

2. In a butter cutter according to claim 1, the leading edge of said worm being yielding, substantially as and for the purpose specified.

3. In a butter cutter according to claim 1, said expressing die including a head for co-operation with the end of the butter block, said rack being mounted on said expressing die in rear of said head and being slidable within said magazine, said worm being adapted to project into said magazine during its periods of engagement with said rack.

4. A butter cutter comprising a magazine for supporting a block of butter, means on said magazine for subdividing the block of butter into a plurality of columns at one end, an expressing die adapted to feed the butter block forward toward said dividing end, a plurality of racks on said expressing die, the teeth of each rack being equidistantly spaced but the spacing of the teeth on the several racks differing from one another, the teeth of said rack being beveled on their underfaces, a shaft journaled on said magazine, a worm including part only of a single screw-thread adapted to co-operate with said racks for intermittently advancing said expressing die, the leading edge of said worm being yielding to cause a partial return of said expressing die when co-operating with a rack having closely spaced teeth, and a cutter carried by said shaft for severing the ends of said columns forced beyond said magazine, said cutter being so mounted in relation to said worm that the cutting operation takes place during the period of disengagement of said worm from said rack.

5. In a butter cutter according to claim 4, said expressing die including a head for co-operation with the end of the butter block, said racks being mounted on said expressing die in rear of said head and being slidable within said magazine, said worm being adapted to project into said magazine during its periods of engagement with a rack.

6. A butter cutter, comprising a magazine of rectangular transverse cross-section of a size to accommodate the transverse cross-section of a block of butter, means on said magazine for subdividing the block of butter into a plurality of columns at one end, an expressing die comprising a skeleton frame adapted to slide in said magazine and to feed the butter block toward the dividing end of said magazine, longitudinal bars on said skeleton frame for cooperation with said magazine and forming guides for the expressing die in its movement within said magazine, four racks on said expressing die running longitudinally of the latter and disposed in two planes intersecting each other at right angles, the teeth of each rack being equidistantly spaced but the spacing of the teeth on the several racks differing from one another, the teeth of each rack being beveled on their underfaces, a shaft journaled on said magazine, a worm including part only of a single screw-thread adapted to co-operate with said racks for intermittently advancing said expressing die, the leading edge of said worm being yielding to cause a partial return of said expressing die when co-operating with a rack having closely spaced teeth, and a cutter carried by said shaft for severing the ends of said columns forced beyond said magazine, said cutter being so mounted in relation to said worm that the cutting operation takes place during the period of disengagement of said worm from said rack.

Signed at New York, in the county of New York, and State of New York, this 10th day of September, A. D. 1928.

CARL A. CARLSTROM.